Jan. 9, 1940. A. C. STOCKER ET AL 2,186,182
FREQUENCY MEASURING DEVICE
Filed Jan. 8, 1938 2 Sheets-Sheet 2
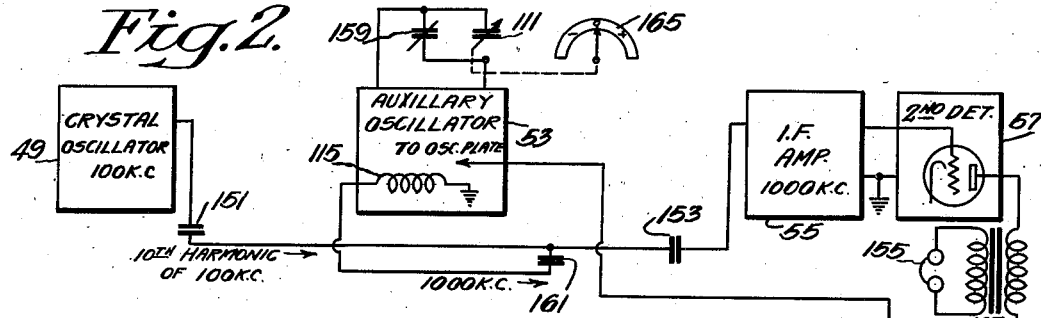
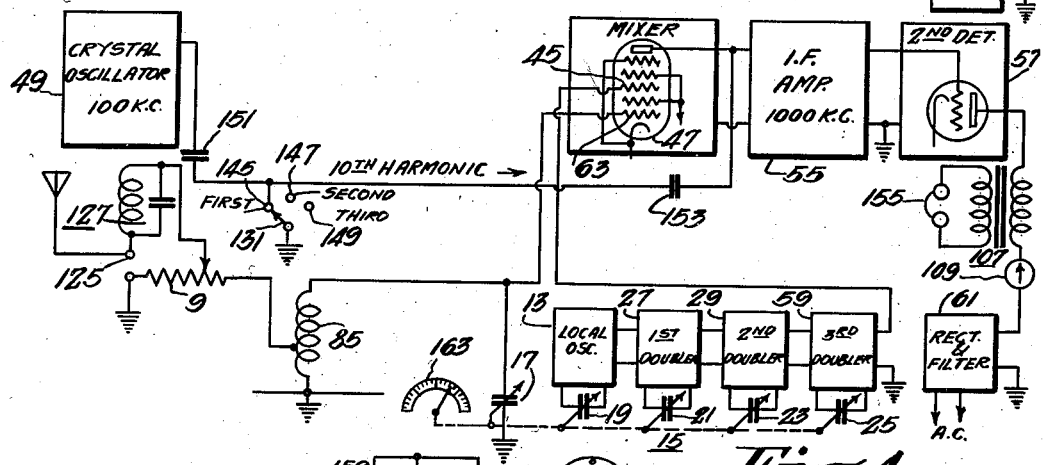
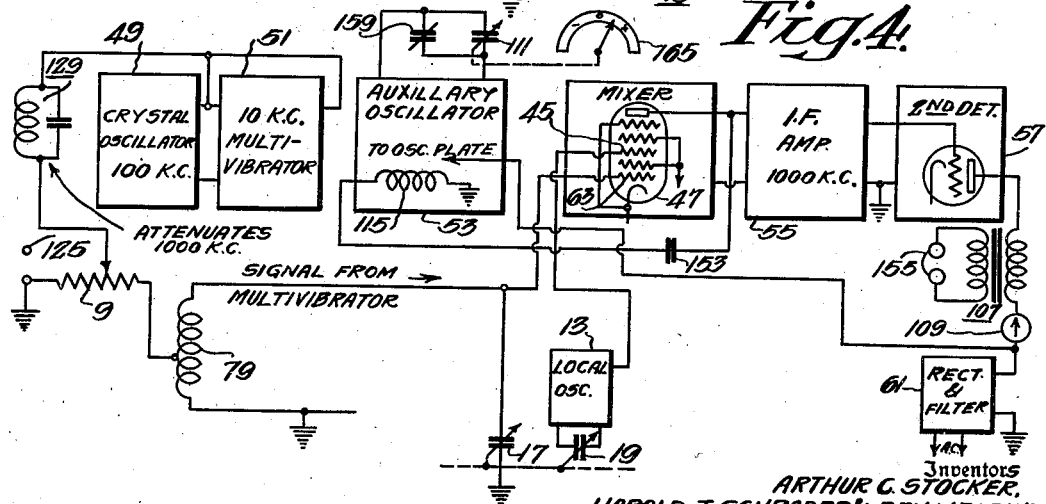
Inventors
ARTHUR C. STOCKER,
HAROLD J. SCHRADER & BEN. W. ROBINS
Attorney Patented Jan. 9, 1940

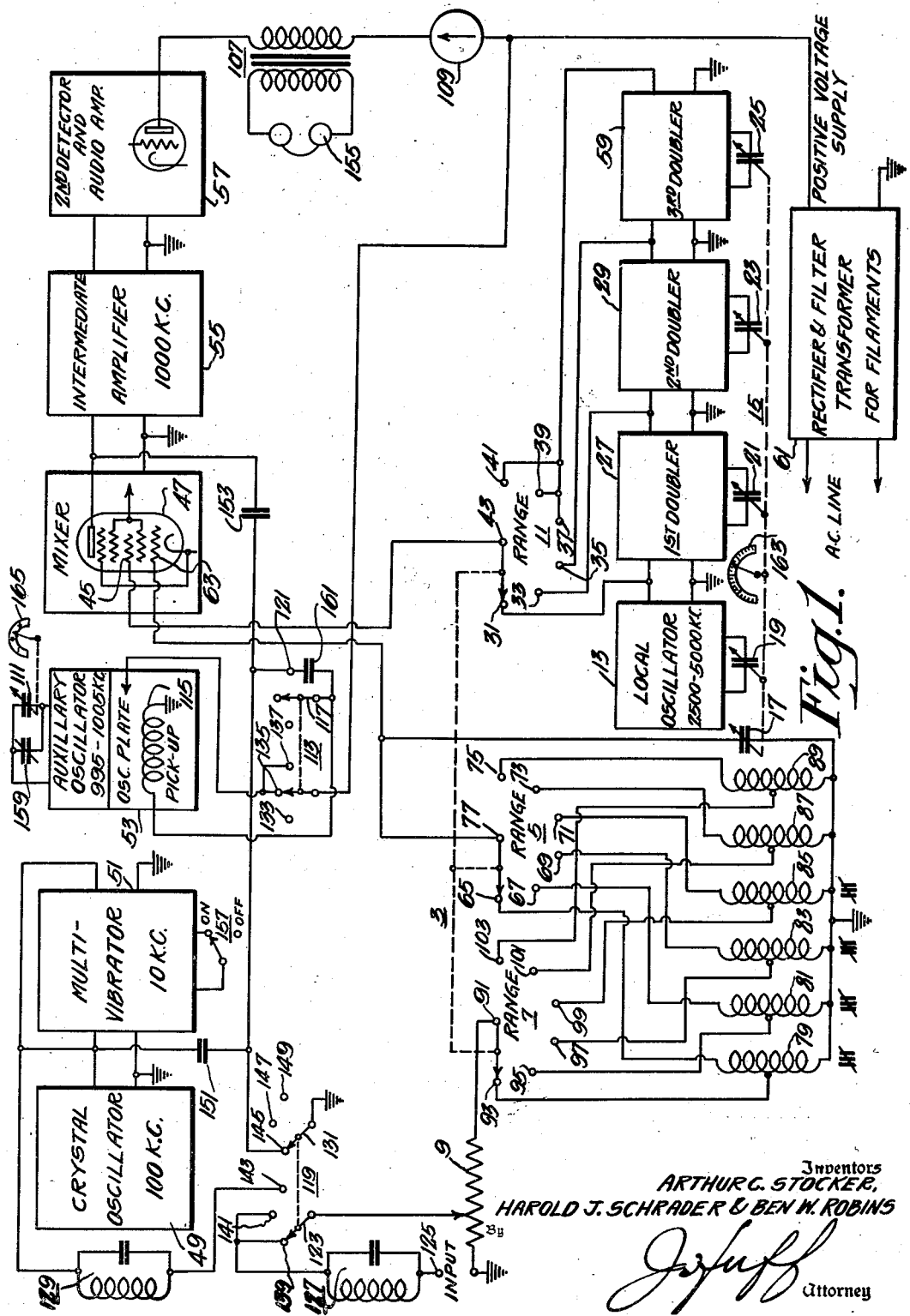

2,186,182

UNITED STATES PATENT OFFICE 2,186,182

FREQUENCY MEASURING DEVICE

Arthur C. Stocker and Harold J. Schrader, Haddon Heights, and Ben W. Robins, Haddonfield, N. J., assignors to Radio Corporation of America, a corporation of Delaware Application January 8, 1938, Serial No. 183,968

5 Claims. (Cl. 250—39)

Our invention relates to frequency measuring devices, and more particularly to a frequency measuring device in which the unknown signal is received, accurately converted to an intermediate frequency by harmonics of a local oscillator, and the fundamental frequency of the local oscillator then measured, whereby the frequency of the unknown is made determinable.

It is customary, in the precise measurement of radio frequency oscillations, to measure an unknown frequency by beating it against a known frequency oscillation and measuring the resultant beat frequency. It is also customary for the known frequency to have such relation to the unknown that the resultant beat is within the audible range, for thereby the audible beat can be accurately measured by audio frequency standards. To do this, it is customary to use a known radio frequency signal which is within 10 kc. of any signal which is to be measured. This is usually accomplished by using the harmonics of a 10 kc. multi-vibrator. While such a system is very accurate at low frequencies, it is not entirely satisfactory at ultra high frequencies, due to the difficulty of determining which harmonic of the multivibrator is beating against the unknown. A further difficulty is met in attempting to combine the very weak higher harmonics of the standard with the unknown signal.

A partial solution to the problem is to make such ultra high frequency measurements with the aid of an auxiliary oscillator operating on a much lower frequency. The auxiliary oscillator is then adjusted so that one of its harmonics beats with the unknown signal. The frequency of the auxiliary is then measured, and the result multiplied by the harmonic used. However, even this method is also subject to the limitation that it is often difficult to know what harmonic is beating with the unknown.

It is, therefore, an object of our invention to provide a method for accurately measuring ultra high frequencies by receiving them in a multiband superheterodyne receiver in which the local oscillator operates in the lowest frequency band. High frequency local oscillations are obtained from cascaded frequency doublers so connected that the proper harmonic for each band is automatically selected by the range switch. A standard frequency generator is included whereby accurate tuning to the intermediate frequency is made possible and the fundamental of the local oscillator measured.

Our invention will be better understood from the following description, when considered in connection with the accompanying drawings. Its scope is indicated by the appended claims.

Referring to the drawings:

Figure 1 is a schematic representation showing the elements of one embodiment of our invention, certain units of this device being so well known to those skilled in the art that they have not been shown in detail;

Figure 2 illustrates how the preliminary adjustment is made;

Figure 3 shows the conditions for reception of the unknown signal and for tuning the local oscillator; and Figure 4 shows the conditions for measuring the fundamental frequency of the local oscillator.

Referring to Fig. 1 of the drawings, a five-section variable capacitor is shown at 15. The first section 17 is connected to the arm of switch 5 and therefore tunes the inductor selected by a three-section range switch 3. The second section 19 tunes a local oscillator 13 throughout the approximate range of 2500 to 5000 kc. The third section 21 tunes the resonant circuit of a first doubler 27, which covers a frequency range from 5,000 to 10,000 kc. The fourth section tunes the second doubler 29 from 10,000 to 20,000 kc. The fifth section 25 tunes the third doubler 59 from 20,000 to 40,000 kc. The multi-unit capacitor 15 is equipped with a precision dial 163 which is accurately calibrated in terms of the frequency covered by the local oscillator 13.

The output from the local oscillator 13 is connected to the first contact point 31 to section 11 of a three-section range switch 3. The output from the first doubler 27 is connected to the second contact point 33. The output from the second doubler is connected to the third contact point 35, and the output from the third doubler is connected to the fourth, fifth and sixth contact points of the switch, as shown at 37, 39 and 41, respectively. The contact arm 43 of switch 11 is connected to the grid 45 of a mixer tube 47.

Another section of the range switch 3 is shown at 5. The first grid 63 of the mixer tube 47 and the capacitor 17 are connected to the moving arm 77 of switch 5. Six contact points 65, 67, 69, 71, 73 and 75 are connected to the ungrounded terminals of six inductors 79, 81, 83, 85, 87 and 89, respectively. The remaining section 7 of the range switch 3 has its movable arm 91 connected to the ungrounded end of the volume control resistor 9. Its six contact points 93, 95, 97, 99, 101 and 103 connect to points intermediate the ends of the respective inductors 79, 81, 83, 85, 87 and 89. Operation of the range switch, therefore, not only selects an input circuit of a successively higher resonant frequency, but also selects a corresponding successively higher harmonic of the local oscillator. For example, in the first position the range switch connects the input to the tap on inductor 79, connects the inductor 79 to the grid of tube 47, and applies the fundamental of the local oscillator to the mixer tube 47. The inductor 79 and the capacitor 17 are resonant to signals from 1500 to 4000 kc. The local oscillator tunes from 2500 to 5000 kc., and since the two circuits are simultaneously tuned over their respective ranges by the same control, two signals are combined in the mixer tube 47 to produce a beat frequency of 1000 kc.

The second position of the range switch 3 selects a reception range of from 4 to 9 mc., while the switch 11 now supplies the mixer tube with effective local oscillations from the first doubler 27, covering from 5 to 10 mc. The third position selects a range of 9 to 19 mc. in the input circuit, and the second doubler 29 now supplies effective local oscillations from 10 to 20 mc. The fourth position resonates the input circuit from 19 to 39 mc., while the third doubler is supplying effective local oscillations from 20 to 40 mc. On the fifth position, the input covers the 39–79 mc. range, but the practical limit of frequency doubling has been reached and so the harmonics in the output of the third doubler are used to provide effective local oscillations from 40 to 80 mc. The sixth position covers a reception range from 79 to 159 mc., and once again harmonics are employed which provide effective local oscillations from 80 to 160 mc. Thus, for each position of the range switch, effective local oscillations are provided 1000 kc. above the resonant frequency of the input circuit for every position of the variable capacitor 15. Because of the amplification and selection of the proper harmonic, the possibility of error in receiving a signal is greatly reduced.

The output of the mixer tube 47 is amplified by an intermediate frequency amplifier 55, tuned to 1000 kc. This is followed by a detector and audio amplifier 57. The output of the audio amplifier is serially connected to the positive voltage supply through the primary of an audio transformer 107 and a plate current meter 109. A pair of headphones 155 may be connected across the secondary of the audio transformer 107.

Additional units in this device include a precision crystal oscillator standard 49, oscillating at 100 kc. and driving a 10 kc. multivibrator 51; and an auxiliary oscillator 53. This auxiliary oscillator may include a suitable triode or pentode oscillator which covers a frequency range from 995 to 1005 kc. It is tuned by a variable capacitor 111, which has a dial 165 calibrated in frequency deviation in cycles above and below 1000 kc. Zero on the dial corresponds to 1000 kc. A small variable capacitor 159 is connected across 111. The positive voltage supply to this auxiliary oscillator is connected through one section of a double switch 113, whereby the oscillator is turned off when the switch is in its first position 133, and turned on when in the remaining two positions 135 and 137. The output of said auxiliary oscillator is obtained from a "pickup" coil 115 which is connected to the arm 117 of the second section of switch 113. A small capacitor 161 of the order of 5 mmfd. is connected between the switch arm 117 and the third contact 121 of the second section of switch 113. The first two contacts of this second section are not used. Contact 121 is also coupled to the input of the intermediate frequency amplifier 55 through a similar small capacitor 153.

A second double section switch 119 is also provided. In the first section of this switch, the arm 123 is connected to the movable arm of the volume control 9. The first and second contact points, 139 and 141, are connected to one terminal of a wave trap 127. The remaining terminal of the wave trap is connected to the ungrounded input terminal 125. The wave trap 127 is resonant at 1000 kc., and its purpose is to prevent the reception of stray signals near the intermediate frequency. The third contact 143 is connected to one terminal of a second wave trap 129. The remaining terminal of 129 is connected to the output of the crystal oscillator and to the multivibrator. The wave trap 129 is resonant at 100 kc. Its purpose is to attenuate the output at the fundamental frequency of the crystal oscillator.

In the second section of switch 119, the movable arm 131 is grounded. The first contact 145 is connected to contact 121 of switch 113, and also through a small capacitor 151 to the output of the crystal oscillator 49. The second and third contacts are open, as shown at 147 and 149. A switch 157 is provided to permit the multivibrator to be independently turned off when not in use.

The operation of measuring an unknown signal frequency will now be explained. It is necessary to make a preliminary adjustment of the auxiliary oscillator frequency. Referring to Fig. 1, set the calibrated dial 165 of capacitor 111 at zero. Place switch 113 in its second position. Turn the volume control 9 to minimum. Turn the multivibrator switch 157 off. Place switch 119 in its second position so that arm 131 contacts 147.

Fig. 2 shows in simplified form the connections made by the preceding operations, and it is seen that the tenth harmonic of the crystal standard will be impressed on the intermediate frequency amplifier through capacitors 151 and 153. In addition, a voltage whose frequency is approximately 1000 kc. will appear in the intermediate frequency amplifier through capacitors 153 and 161 from the auxiliary oscillator 53. Consequently, a beat note will be heard in the headphones 155. Reduce this beat note to "zero beat" by means of variable capacitor 159. The meter 109 is very useful for this purpose, for the beat can be observed by the motion of the meter pointer. This adjustment must be made very accurately.

The measurement may now be made. It is necessary to reset the switch positions. Referring again to Fig. 1, select the range on the range switch 3 corresponding to the frequency of the signal to be measured. If a modulated signal is to be measured, place switch 119 in the first position. Switch arm 131 then grounds contact 145 and prevents the crystal oscillator from creating a beat note in the intermediate frequency amplifier when a signal is received. If an unmodulated signal is to be measured, place switch 119 in the second position. Sufficient voltage will then be supplied the intermediate frequency amplifier, through 151 and 153, to permit "beat" reception. Place switch 113 in its first position, thereby stopping the auxiliary oscillator. Advance the volume control 9 to maximum. Tune capacitor 15 until the signal to be measured is received. If switch 119 is not already in the second position, it should now be placed there.

These connections in simplified form are shown in Fig. 3. The beat note which is heard is the result of the combination of the tenth harmonic of the standard frequency oscillator 49 with the difference frequency resulting from the mixing of the effective local frequency and the unknown signal, in the customary manner of superheterodyne receivers. Tune the local oscillator until an exact zero beat is obtained. The meter 109 is again useful for this purpose. The local oscillator, or some harmonic thereof, is now exactly 1000 kc. above the frequency of the unknown signal. It is therefore evident that if the local oscillator frequency can be measured the unknown frequency may readily be determined. It is precisely this operation which is accomplished by this device.

As explained above, the local oscillator is operated at frequencies between 2500 and 5000 kc. Reception is accomplished in all but the lowest range by the use of harmonics strengthened by one or more doubler stages of amplification 27, 29 and 59. The actual harmonic used is determined by the range switch 11, which automatically selects the proper harmonic for the range required. The table below shows the relation between the reception range, the oscillator frequency, the harmonic used, and the effective oscillator frequency.

| Reception range | Fundamental oscillator frequency | Harmonic used | Effective oscillator frequency |
|---|---|---|---|
| Megacycles | Megacycles | | Megacycles |
| 1.5– 4.0 | 2.5–5.0 | Fundamental. | 2.5– 5.0 |
| 4 – 9 | 2.5–5.0 | 2nd– | 5.0– 10 |
| 9 – 19 | 2.5–5.0 | 4th– | 10 – 20 |
| 19 – 39 | 2.5–5.0 | 8th– | 20 – 40 |
| 39 – 79 | 2.5–5.0 | 16th– | 40 – 80 |
| 79 –159 | 2.5–5.0 | 32nd– | 80 –160 |

The next operation is to measure the fundamental frequency of the local oscillator. Referring again to Fig. 1, place switch 113 in its third position so that switch arm 117 contacts 121, short-circuits capacitor 161, and connects contact 121 to the pick-up coil 115. Coil 115 has a comparatively small inductance and consequently a low impedance. The 1000 kc. voltage appearing across it is applied to the intermediate frequency amplifier, but its low impedance effectively prevents any voltage from the crystal oscillator from getting into the amplifier. Place switch 119 in its third position so that switch arm 123 contacts 143. Turn the multivibrator switch 157 on. The output of the 10 kc. multivibrator is now applied to the volume control 9, and will appear on the grid 63 of the mixer tube. Place the range switch 3 in the first or low frequency position.

Referring to Fig. 4, it is seen that the fundamental frequency output of the local oscillator appears on the grid 45 of the mixer tube. To whatever frequency the local oscillator may be tuned, it beats with one of the 10 kc. harmonics from the multivibrator to give a signal within 5000 cycles of the intermediate frequency. This signal beats with the 1000 kc. signal supplied by the auxiliary oscillator to give an audio beat within 0 and 5000 cycles. Capacitor 111 may now be tuned until the audio beat note is reduced to zero. Note the frequency deviation which is indicated on its dial 165.

The fundamental frequency of the local oscillator may now be calculated. The local oscillator frequency necessarily falls between two adjacent signals from the multivibrator which are 10 kc. apart. Reference to the calibration of the local oscillator on dial 163 will indicate its approximate frequency, and therefore the two frequencies which are multiples of 10 kc. above and below the local oscillator are known. The actual oscillator frequency is determined by the reading obtained from the dial 165. Add this reading to the 10 kc. step below the approximate frequency, if the reading is above 1000 kc. Subtract this reading from the next higher 10 kc. step if said reading is below 1000 kc. It is to be noted that the accuracy of this measurement is only limited by the accuracy of the crystal oscillator standard and the audio frequency calibration of the dial 165.

If the unknown signal was received in the low frequency range, its frequency is equal to the frequency of the local oscillator, as determined above, minus 1000 kc. In the higher frequency bands, it is necessary to multiply the local oscillator frequency by a power of 2 before subtracting 1000 kc.

This may be stated in the tabular form shown below, where $f_m$ = measured frequency in kc.
$f_o$ = local oscillator frequency as determined in the manner explained above.

| Range | $f_m$ |
|---|---|
| 1.5–4 mc | $f_o$–1000 |
| 4–9 mc | $2f_o$–1000 |
| 9–19 mc | $4f_o$–1000 |
| 19–39 mc | $8f_o$–1000 |
| 39–79 mc | $16f_o$–1000 |
| 79–159 mc | $32f_o$–1000 |

We have thus provided a means for accurately measuring unknown frequencies in the medium and ultra high frequency ranges. Our method is unique in its operation of the local oscillator of a multiband superheterodyne receiver in the low frequency band regardless of the frequency received. It is unique in its use of a selected harmonic intensified by cascaded frequency doublers as the local oscillator of a superheterodyne receiver. It beats the local oscillator with a crystal oscillator standard and calibrated auxiliary oscillator whereby the fundamental of the local oscillator may be accurately measured to determine thereby the frequency of an unknown signal. With a device of the type described, it is possible to attain an accuracy of ±.005% at any frequency within its range.

We claim as our invention:
1. The method of measuring radio frequencies which comprises generating local oscillations which are tunable in a low radio frequency range, amplifying successive harmonics of said local oscillations, resonating the unknown signal to be measured and at the same time automatically selecting the harmonic proper for use with said unknown signal, mixing the unknown signal and the selected harmonic so as to produce an intermediate radio frequency equal to their difference, beating said difference frequency against a precision standard frequency, adjusting said local oscillations until said difference frequency equals said standard frequency, and measuring the frequency of said local oscillator, thereby determining the frequency of the unknown.

2. In a frequency measuring device, the combination including means selectively responsive to radio frequency signal currents which are to be measured and which fall in any one of a plurality of frequency bands, means for generating local radio frequency oscillations, means for tuning said local oscillations over a range of frequencies which is a predetermined amount higher than the range of the lowest frequency band covered by said responsive means, means for selecting a current the frequency of which is equal to the fundamental or a known harmonic of said local oscillator, means for combining said signal currents and said selected fundamental or harmonic current to obtain a predetermined intermediate radio frequency current having a frequency equal to the difference of the frequencies of the combined currents, and means for measuring the fundamental frequency of said local oscillator to determine the frequency of said signal currents.

3. In a device for measuring radio frequency signals which comprises a multirange superheterodyne radio receiver whose local oscillator operates in a predetermined relation to signals in the lowest frequency range and which utilizes harmonics of said local oscillator for the higher frequency ranges, the method of operation which includes selecting the range of operation of said receiver which corresponds to the approximate frequency of the signal to be measured and thereby automatically selecting the harmonic of said local oscillator which is required to produce an aproximate intermediate frequency signal, accurately adjusting said local oscillator to obtain an exactly predetermined intermediate frequency signal, and measuring the frequency of the local oscillator to determine the frequency of the signal.

4. In a frequency measuring device, the combination which includes a plurality of input circuits responsive to signal voltages of successively higher frequency ranges; means for selecting one of said input circuits; means for tuning said selected circuit over a frequency range; a local radio frequency oscillator; means operatively connected to said tuning means for tuning said local oscillator over a range of frequencies which bears a predetermined relation to the range of frequencies covered by the input circuit responsive to the lowest of said successively higher frequency ranges, means for obtaining successive harmonics of said local ocillator; means operatively connected to said input circuit selecting means for automatically selecting the fundamental or a harmonic of said local oscillator which bears said predetermined relation to the input circuit frequency which is concurrently selected; means for mixing said signal voltage and said selected fundamental or harmonic of said local oscillator to obtain a predetermined intermediate radio frequency current, and means for accurately measuring the fundamental frequency of said local oscillator.

5. In a frequency measuring device, the combination including an input system consisting of a plurality of inductors of successively decreasing inductance, a first selector switch for effectively connecting a first variable capacitor across a desired one of said plurality of inductors, a thermionic local radio frequency oscillator which is tuned by a second variable capacitor operatively connected to said first variable capacitor, said local oscillator being a predetermined frequency above the resonant frequency of the input circuit covering the lowest frequency range, a plurality of frequency-doubling amplifiers for obtaining successive harmonics of said local oscillator connected in cascade and tuned by capacitors operatively connected to said first and second variable capacitors, a second selector switch operatively connected to said first selector switch for selecting a harmonic of said local oscillator which, at every point over its range, is substantially a predetermined frequency above the resonant frequency of the input circuit concurrently selected by said first selector switch, a thermionic tube having input and output electrodes, means including said input circuit for impressing a signal of unknown frequency on an input electrode of said tube, means for impressing said selected harmonic on an input electrode of said tube to produce a beat frequency equal to the difference of said unknown and said selected harmonic frequencies, and means for measuring the fundamental frequency of said local oscillator, whereby the frequency of said unknown may be determined.

ARTHUR C. STOCKER.
HAROLD J. SCHRADER.
BEN W. ROBINS.